March 30, 1926. 1,578,375
E. SEHL
CUTTING MACHINE
Filed Dec. 28, 1923
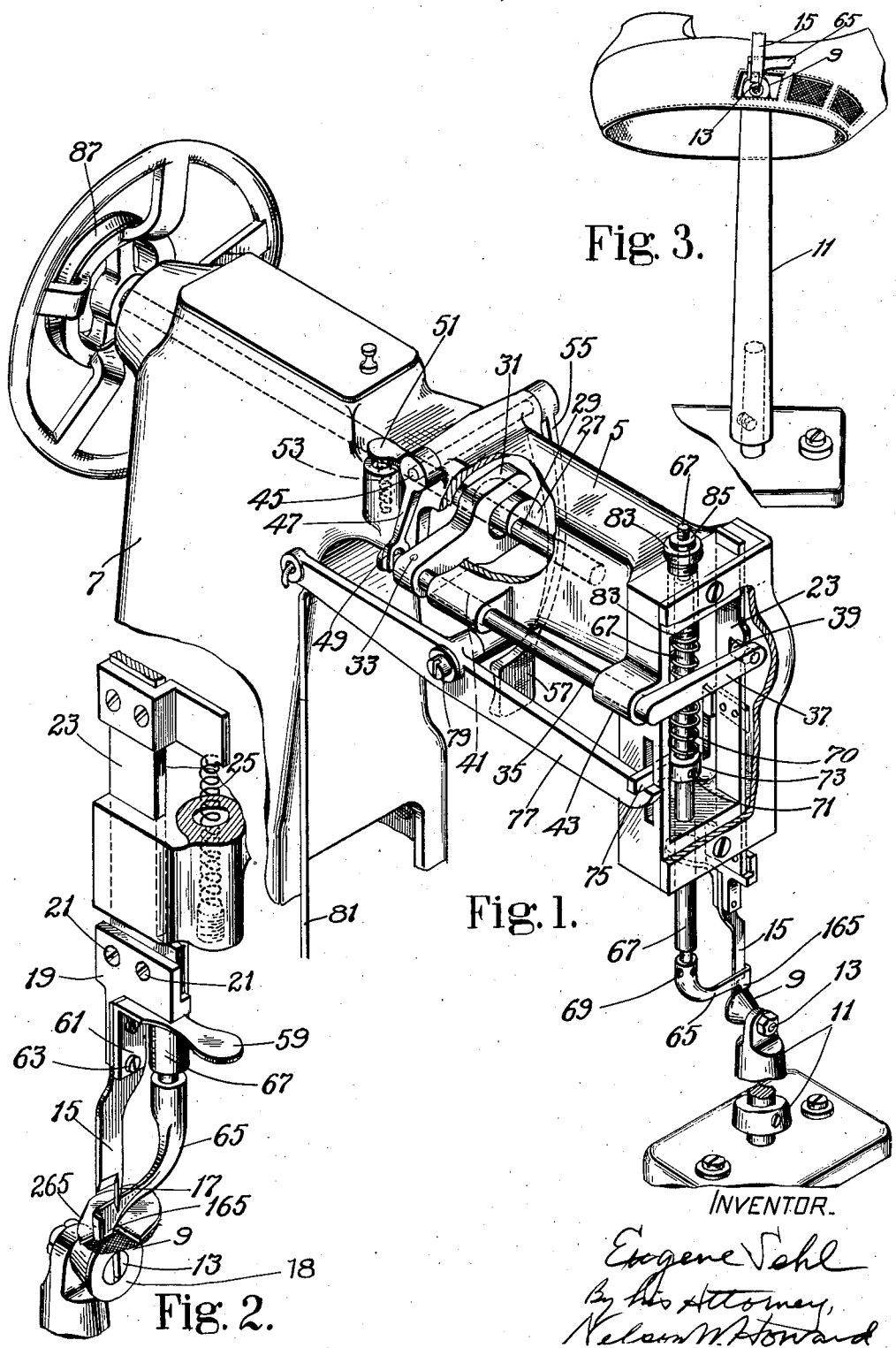
INVENTOR.
Eugene Sehl
By his Attorney,
Nelson W. Howard Patented Mar. 30, 1926.

1,578,375

UNITED STATES PATENT OFFICE.

EUGENE SEHL, OF ST. LOUIS, MISSOURI, ASSIGNOR TO UNITED SHOE MACHINERY CORPORATION, OF PATERSON, NEW JERSEY, A CORPORATION OF NEW JERSEY.

CUTTING MACHINE.

Application filed December 28, 1923. Serial No. 683,183.

*To all whom it may concern:*

Be it known that I, EUGENE SEHL, a citizen of the United States, residing at St. Louis, and State of Missouri, have invented certain Improvements in Cutting Machines, of which the following description, in connection with the accompanying drawings, is a specification, like reference characters on the drawings indicating like parts in the several figures.

This invention relates to cutting machines and is herein illustrated as embodied in a machine particularly designed for use in the manufacture of boots and shoes.

In the manufacture of certain kinds of fancy shoes it is customary to die out ornamental openings in the upper, to attach the lining to the upper by stitches which extend along the edges of the openings in the upper, and later to cut out those portions of the lining which are exposed by the died-out openings in the upper. The portions of the lining which are thus exposed are commonly known as "panels", and the operation of cutting them out as "panel cutting", and these terms will be used to promote brevity.

The panel cutting may be done in the stitching-room before the lined upper has been attached to the sole or insole and while it, or portions of it, may be spread out substantially flat; but preferably the cutting is done in the packing-room after the shoe is otherwise complete, since, if the cutting is done in the stitching-room, the subsequent stretching of the upper during the pulling-over and lasting operations is liable to distort the shapes of the ornamental openings. Whether the cutting-out of the panels is done in the stitching-room or in the packing-room, it is necessary to provide means for piercing the panels to start the cut and a construction which permits the work to be turned freely during the cutting operation so that the cutter may be caused to follow the irregular outlines of the panels.

According to one feature of the invention, there is provided a shear member over which the work is fed and a cooperating reciprocating cutter having a pointed portion. In the illustrative machine the cutter may be disconnected at any time from its reciprocating mechanism and when so disconnected is automatically raised and held raised above the work to permit the operator to move the work so as to present a fresh panel to the cutter. As soon as this presentation has been made, the cutter is once more thrown into operation, the first downward movement of it serving, through its pointed portion, to pierce the panel so as to start the cut.

According to another feature of the invention, the portion of the work which is being operated upon is supported at the end of a member of small cross-section, which is shaped and positioned to provide about its work supporting portion a free and unobstructed space. In the illustrative machine the shear member referred to above is mounted upon the upper end of a slender post so that the work, while being operated upon may be readily manipulated to cause the cutter to sever a panel completely.

These and other features of the invention, including certain details of construction and combinations of parts, will be described as embodied in an illustrative machine and pointed out in the appended claims.

Referring now to the accompanying drawings,

Figure 1 is a perspective of a machine in which the present invention is embodied.

Figure 2 is a perspective showing on an enlarged scale part of the cutter operating mechanism, and Figure 3 is a perspective showing a shoe in process of being operated upon.

The operative parts of the machine, except the work support, are carried at the end of an overhanging arm 5 which extends horizontally from a column 7, said column rising to such a height above the bench upon which the machine stands that room is provided beneath the cutter to swing a shoe or a closed vamp. The work at the locality being operated upon is supported well above the level of the bench upon a shear member 9 mounted at the end of a slender support herein shown as an upright post 11. The shear member is in the form of a truncated cone freely revoluble upon a horizontal pivot 13 carried at the extreme upper end of the post. A reciprocating cutter 15 having a pointed portion 17 rubs against the exposed flat end 18 of the shear member 9 and cooperates with the shear member to sever the lining material. The cutter is carried by a block 19 which is adjustably fastened by screws 21 to the lower end of a cutter-bar 23, the adjustment being in a direction to permit the cutter to be positioned properly with respect to the flat face of the shear member 9.

It is necessary, when one panel has been cut out, to raise the cutter above the work so as to permit a second panel to be moved into position to be operated upon; and it is also desirable that, when the cutter is raised, its reciprocation should cease so that the operator may position the work accurately with respect to the pointed portion 17 so as to be able to start the new cut in exactly the desired locality. To this end, the cutter-bar 23 is urged upwardly at all times by a spring 25 so that when as will be presently explained, the cutter-bar is disconnected from its actuating mechanism, the bar and cutter will be held in raised position. The cutter-bar is reciprocated from an eccentric 27 on the driving shaft 29 through a yoke 31 the tail of which is fastened by a pin 33 to one end of a rock-shaft 35 the other end of which carries an arm 37 on the outer end of which is a roller 39. This roller normally extends into a horizontal slot in the cutter-bar 23 so that oscillation of the rock-shaft 35 causes reciprocation of the cutter-bar. In order to permit the cutter-bar to be disconnected from the roller 39, the rock-shaft 35 is slidable in its bearings 41, 43, being normally held in the position shown but being capable of being moved to the right as viewed in Fig. 1 so as to withdraw the roller 39 from the slot in the cutter-bar.

Fast to one end of a small rock-shaft 45 is an arm 47 having at its lower end a yoke 49 which straddles the rock-shaft 35 and is held from movement longitudinally of the rock-shaft by two collars which are fast to the shaft. The hub of the arm 47 has a lug 51 the under side of which is engaged by the upper end of a compression spring 53 seated in a socket in a stationary part of the machine, the spring acting to urge the rock-shaft 35 to the left and thus to hold the roller 39 in the slot in the cutter-bar. In order to provide means for sliding the rock-shaft to the right, when desired, there is fast to the far end of the small rock-shaft 45 an arm 55 having at its lower end a finger-piece 57. Normally the parts are in the positions shown in Fig. 1 in which the cutter is connected with its driving mechanism and is being rapidly reciprocated. At any time, however, the operator may push the finger-piece 57 to the right whereupon the connection is broken, and the cutter-bar is raised by the spring 25 into the position shown in Fig. 2. The arm 37 continues to oscillate; but, since the roller 39 is out of register with the slot in the cutter-bar, no reciprocation is imparted to the bar. When, now, the operator desires to lower the knife so as to cause the pointed portion 17 to pierce the work, he pushes down upon a finger-piece 59. This finger-piece has a depending portion 61 between which and a flat face on a depending portion of the block 9 the cutter is adjustably held by screws 63 which pass through a vertical slot (not shown) formed in the upper portion of the stem of the cutter. Pushing down upon the finger-piece 59 lowers the cutter-bar and thereby brings the slot in it down into position to receive once more the roll 39 on the oscillating arm 37, the spring 53 serving to cause the roll to enter the slot.

In order to aid in guiding the work as well as to prevent injury by the cutter both to the work and to the fingers of the operator, a combined gage and guard member 65 is provided, said member having a portion 165 extending in a plane substantially parallel to the plane of the cutter and a portion 265 extending in a plane substantially at right angles thereto. The portion 165 is adapted to run in contact with the edge of the opening in the upper and thereby serve both to guide the work and to prevent accidental cutting of the upper. The portion 265 is adapted to prevent injury to the fingers of the operator. When the cutter is raised and brought to rest in the position shown in Fig. 2, preparatory to starting the cutting-out of a fresh panel, the guard 65 should also be raised. In order to permit raising of the guard, when desired, the rod 67, upon the lower end of which the guard is adjustably fastened by screws 69, has fastened to it by a set-screw 71 a collar 73 having a finger 75 against the under side of which bears one end of a lever 77. This lever is pivoted near its middle at 79 to the stationary arm 5 and at its left-hand end to the upper end of a treadle rod 81, the lower end of which is connected with a treadle, not shown. Consequently, when the treadle is depressed, the member 65 is raised. The rod 67 is urged downwardly at all times by a coiled spring 70 the lower end of which rests upon the collar 73 and the upper end of which bears against the under side of a sleeve 83 having a knurled head by which it may be turned to vary the tension of the spring. The rod 67 passes up through this sleeve and has threaded upon its upper end a nut 85 by which the downward movement of the rod 67, and with it the guard 65, is limited. In practice the nut is adjusted into a position to permit the combined guard and gage 65 to ride easily over the panel with the lower portion of its vertical face (the one exposed to view in Fig. 1) in contact with the edge of the opening in the upper.

Assuming that the driving shaft 29 is being rotated by power applied to the pulley 87, the finger piece 57 is manipulated to cause the cutter to rise into the position shown in Fig. 2 and come to rest. The treadle is then depressed to raise the guard and gage 65 after which the part of the work to be operated upon is placed over the shear member 9 and beneath the cutter and the guard. The finger piece 59 is pushed down to pierce the panel at the desired point, the treadle is released to permit the guard to descend, and the operator then feeds the work turning it as may be necessary to cause the panel to be cut out.

By mounting the shear member at the end of a slender support such as the upright post shown, a free and unobstructed space is provided so as to permit the work to be properly manipulated during the cutting operation.

Although the invention has been set forth as embodied in a particular machine, it should be understood that the invention is not limited in the scope of its application to the particular machine which has been shown and described.

Having described my invention, what I claim as new and desire to secure by Letters Patent of the United States is:—

1. A machine for cutting panels from the upper of a shoe having, in combination, a work support adapted to enter a shoe so as to support the upper from the inside thereof and to permit the shoe to be moved with respect to it, a cutter having a portion adapted to pierce a panel, and means for separating the cutter and support sufficiently to permit the shoe to be moved so as to bring a panel into operative position with respect to the cutter preparatory to the piercing operation.

2. A machine for cutting panels from the upper of a shoe having, in combination, a cutter having a pointed portion adapted to pierce a panel, means for reciprocating the cutter, a shear member with which the cutter cooperates, and a support at one end of which the shear member is mounted, said support being of small cross-section and adapted to enter the shoe and to permit the shoe to be moved with respect to it to facilitate the cutting out of the panels.

3. A machine for cutting a panel from the upper of a shoe having, in combination, a cutter adapted first to pierce the panel and then to cut it out, means for reciprocating the cutter, a support adapted to enter the shoe so as to support the desired portion of the upper from the inside thereof and to permit movement of the shoe with respect to it, the construction and arrangement being such that the cutter may be rendered inoperative when desired so as to permit a selected panel to be brought into its path of reciprocation, and a gage adapted to contact with the edge of the upper to facilitate the piercing of the panel at the desired locality and to aid in guiding the work during the cutting-out of the panel.

4. A machine of the class described having, in combination, a frame having an overhanging arm, a cutter mounted upon the arm, a work-engaging member located close to the cutter and also mounted upon the arm, said cutter having a pointed portion adapted to pierce the work, mechanism for reciprocating the cutter, means for normally holding the cutter disconnected from its reciprocating mechanism and raised above the work, means for lowering the cutter and at the same time connecting it with the reciprocating mechanism, a shear member arranged to cooperate with the cutter, and a support of small cross-section upon which the shear member is mounted.

5. A machine of the class described having, in combination, a frame having an overhanging arm, a cutter and a combined cutter guard and work gage mounted on the arm, said cutter having a pointed portion adapted to pierce the work, mechanism for reciprocating the cutter, means for disconnecting the cutter from its reciprocating mechanism and for raising it until the pointed portion is above the work, a shear member arranged to cooperate with the cutter, and a support of comparatively small cross-section upon which the shear member is mounted, there being a free and unobstructed space about the support to permit the work to be turned freely.

6. A machine of the class described having, in combination, a frame having an overhanging arm, a cutter and a combined cutter guard and work gage mounted on the arm, said cutter having a pointed portion adapted to pierce the work, mechanism for reciprocating the cutter, means for disconnecting the cutter from its reciprocating mechanism and for raising it until the pointed portion is above the work, a shear member arranged to cooperate with the cutter, and a substantially upright post of small cross-section upon which the shear member is rotatably mounted.

7. A machine for cutting a panel from the upper of a shoe having, in combination, a cutter having a pointed portion adapted to pierce the panel, a combined cutter-guard and work gage adapted to ride on the panel close to the edge of the opening in the upper, a shear member adapted to cooperate with the cutter, and a support of comparatively small cross-section upon which the shear member is mounted, there being a free and unobstructed space about the shear member to permit the shoe to be manipulated so as to cause the cutter to sever the panel completely close to the edge of the opening in the upper.

8. A machine for cutting a panel from the upper of a shoe having, in combination, a cutter having a pointed portion adapted to pierce the panel, a combined cutter-guard and work gage adapted to ride on the panel close to the edge of the opening in the upper, a shear member adapted to cooperate with the cutter, and a substantially upright post upon the upper end of which the shear member is mounted, there being a free and unobstructed space about the shear member to permit the upper to be manipulated so as to cause the cutter to sever the panel completely close to the edge of the opening in the upper.

9. A machine for cutting panels from the upper of a shoe having, in combination, a cutter, means for operating the cutter, a shear member, and a support at one end of which the shear member is mounted, said support being of small cross-section and shaped and positioned to provide about the shear member a free and unobstructed space to permit ready manipulation of the work.

10. A machine of the class described having, in combination, a support for a piece of work having panels therein, said support being shaped and positioned to permit the work to be turned freely, a cutter having a pointed portion, means for reciprocating the cutter, and operator-controlled means for raising the cutter until its pointed portion is above the level of the work and for disconnecting the cutter from its reciprocating mechanism so that the work may be moved into position to present a fresh panel to the cutter while said cutter is stationary.

11. A machine of the class described having, in combination, a support for a piece of work having panels therein, a cutter having a downwardly extending pointed portion, means for holding the cutter stationary with its pointed portion raised above the support a distance sufficient to permit a portion of the work to be moved between the point and the support so as to bring a panel into position to be cut and means for lowering the cutter and reciprocating it in such manner that the point remains below the level of the work support.

12. A machine for cutting panels from a shoe having, in combination, a support for the shoe constructed and arranged to enter the shoe and to permit the panels to be fed over it, a cutter, means whereby the cutter and support may be held spaced from each other a distance sufficient to permit a panel to be brought into position between the knife and the support, and means for causing relative movement of approach between the cutter and the support to cause the cutter to pierce the panel and for imparting to the cutter a reciprocating movement.

13. A machine for cutting panels from a shoe having, in combination, a support for the shoe constructed and arranged to enter the shoe and to permit the panels to be fed over it, a cutter, means whereby the cutter may be held stationary above the support to permit a panel to be brought into position between it and the support, and means for lowering the cutter and imparting to it a reciprocating movement.

In testimony whereof I have signed my name to this specification.

EUGENE SEHL.